US006848374B2

United States Patent
Srinivasachar et al.

(10) Patent No.: US 6,848,374 B2
(45) Date of Patent: Feb. 1, 2005

(54) CONTROL OF MERCURY EMISSIONS FROM SOLID FUEL COMBUSTION

(75) Inventors: Srivats Srinivasachar, Sturbridge, MA (US); Shin G. Kang, Simsbury, CT (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/453,140

(22) Filed: Jun. 3, 2003

(65) Prior Publication Data

US 2004/0244657 A1 Dec. 9, 2004

(51) Int. Cl.[7] .................................................. F23J 15/00
(52) U.S. Cl. ................ 110/345; 110/165 R; 423/239.1; 208/91
(58) Field of Search .................................. 110/345, 342, 110/215, 344, 165 R; 95/901, 134; 423/239.1; 208/85, 91

(56) References Cited

U.S. PATENT DOCUMENTS

| | | | |
|---|---|---|---|
| 4,274,842 A | * | 6/1981 | Lindau .......................... 95/108 |
| 4,530,291 A | * | 7/1985 | Wysk ........................... 110/342 |
| 4,863,489 A | * | 9/1989 | Suggitt ....................... 48/197 R |
| 4,913,068 A | * | 4/1990 | Brannstrom ................. 110/342 |
| 5,024,169 A | * | 6/1991 | Borowy .................... 110/165 A |
| 5,216,966 A | * | 6/1993 | Martin ......................... 110/216 |
| 5,345,883 A | * | 9/1994 | Panos .......................... 110/345 |
| 5,507,238 A | * | 4/1996 | Knowles ...................... 110/245 |
| 5,659,110 A | * | 8/1997 | Herden et al. ............... 588/207 |
| 6,103,205 A | * | 8/2000 | Wojtowicz et al. .......... 423/210 |
| 6,521,021 B1 | * | 2/2003 | Pennline et al. ............... 95/134 |

* cited by examiner

*Primary Examiner*—Kenneth B. Rinehart
(74) *Attorney, Agent, or Firm*—Russell W. Warnock (57) ABSTRACT

A system 26 for removing elemental mercury or mercury compounds handles carbonaceous sorbent 28 of a starter batch stored in a silo 30 in an agglomerated state. The sorbent 28 is fed by a feeder 32 to a separation device 34, which comminutes (if necessary) and de-agglomerates the sorbent particles 28 to their primary size distribution. This device 34 may be a particle-particle separator or a jet mill, where compressed air or high-pressure steam is the energy source. The de-agglomerated sorbent 28 of a contact batch created from the starter batch is conveyed by an airsteam for injection at a contact location 66 in a flue gas duct whereat carbonaceous sorbent of the contact batch adsorbs mercury from the flue gas.

20 Claims, 7 Drawing Sheets

Effect of Particle Size and Iodine Treatment on Mercury Capture

Figure 6

Effect of Dispersion on In-situ Particle Size Distribution

CONTROL OF MERCURY EMISSIONS FROM SOLID FUEL COMBUSTION

BACKGROUND OF THE INVENTION

The present invention relates to apparatus and a method for removing mercury from the products of solid fuel combustion including flue gases and more particularly to apparatus and a method for removing elemental mercury or mercury compounds from the flue gases from coal combustion.

The use of activated carbon for the adsorption of mercury vapor has been successfully demonstrated in various applications such as municipal waste incineration. However, there are significant differences in the concentration of mercury from waste incinerators compared to coal-fired power plants with the concentration from the coal-fired power plants being anywhere from 10 to 100 times lower. Also, the mercury from waste incinerators is usually in the form of mercury chloride whereas the mercury from coal-fired power plants is usually in the form of elemental mercury. Both of these differences make it more difficult to remove the mercury from the flue gas from a coal-fired power plant.

The utilization factor for activated carbon is limited by the relatively large particle size and low surface area which limits the adsorption of mercury. Using activated carbon with mean particle size of about 5 microns with a top size of about 10 microns would improve the mercury capture efficiency, but storage, handling, transport and dispersion of these articles is extremely difficult. As a result, the use of activated carbon for mercury capture in coal-fired power plants is too costly. In such applications, the utilization of the activated carbon is quite low with a minimum mole ratio of carbon to mercury of 10,000 to 1.

Another form of carbon which has been proposed for the capture of mercury from flue gases is carbon black. Carbon black is a finely divided form of carbon produced by the incomplete combustion or thermal decomposition of a hydrocarbon fuel. The most common form of carbon black is referred to as furnace black or soot which is made by burning natural gas or petroleum oil in a closed furnace with about 50% of the air required for complete combustion. The external surface area of the carbon black is about 100 times that of activated carbon. This could result in a significant decrease of the C/Hg mole ratio for effective mercury capture compared to activated carbon. As the market price for carbon black is similar to that for activated carbon, there is the potential for a significant cost reduction.

Carbon black generation for the capture of mercury from a refuse incinerator is disclosed in the International Patent Application PCT/SE93/00163 (International Publication Number WO 93/20926). This is characterized by the burning of a fuel with a deficiency of oxygen in a separate incinerator and injecting the soot-laden flue gas into the flue gas from the refuse incinerator. However, oxygen deficient combustion leads to the generation of other pollutants such as carbon monoxide and unburned hydrocarbons. Even if the flue gas from the carbon black generator were to be injected upstream of an acid gas removal device such as a flue gas scrubber, the carbon monoxide and unburned hydrocarbons would not be destroyed or removed.

Another problem with the application of prior art carbon black and activated carbon-based methods for mercury capture from incinerators to the capture of mercury from coal-fired power plants is that refuse incinerators have high chlorine levels and the mercury is present in the flue gas predominantly as mercury chloride as previously stated. In coal-fired power plants, the mercury is usually elemental. Although carbon black and activated carbon have a relatively high affinity for the adsorption of mercuric chloride, they have a relatively lower affinity for the adsorption of elemental mercury.

SUMMARY OF THE INVENTION

An object of the present invention is to provide a method for the capture of mercury from a coal-fired power plant with carbonaceous sorbent without emitting pollutants generated in the production of the carbonaceous sorbent. The invention involves producing the carbonaceous sorbent and eliminating pollutants which may be generated during its production. The invention also may involve the treatment of the carbonaceous sorbent to enhance the capture of elemental mercury.

In accordance with one aspect of the present invention, there is provided an apparatus for removing mercury from the products of fuel conversion which includes means for separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}<15$ microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch, and means for disposing the contact batch of carbonaceous sorbent into contact with the products of fuel conversion at a contact location such that the carbonaceous sorbent of the contact batch adsorbs mercury.

Additionally, in the one aspect of the present invention, the apparatus further includes transport means for transporting carbonaceous sorbent of the contact batch to the contact location in a manner in which, on average, at least ninety percent (90%) of the carbonaceous sorbent of the contact batch is delivered to the contact location in less than thirty (30) minutes following the conversion of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch. Also, the apparatus preferably includes means for separating carbonaceous sorbent which has absorbed mercury from the products of fuel conversion.

With regard to a further feature of the apparatus of the present invention, the means for separating a starter batch of carbonaceous sorbent includes particle size reducing means for reducing the particle size of carbonaceous sorbent from a relatively larger coarse particle size to a relatively smaller fine particle size. With regard to another further feature of the apparatus of the present invention, the means for separating a starter batch of carbonaceous sorbent is operable to create a contact batch of carbonaceous sorbent having a primary particle size distribution of carbonaceous sorbent of $d_{50}<8$ microns, where $d_{50}$ represents 50% of the particles by mass in the entire distribution in the contact batch.

Alternatively, with regard to yet another further feature of the apparatus of the present invention, the means for separating a starter batch of carbonaceous sorbent is operable to create a contact batch of carbonaceous sorbent having a primary particle size distribution of carbonaceous sorbent of $d_{50}<4$ microns, where $d_{50}$ represents. 50% of the particles by mass in the entire distribution in the contact batch.

With regard to an additional feature of the apparatus of the present invention, the apparatus also includes means for depositing at least one of a halogen species and an acidic species on the carbonaceous sorbent of the contact batch prior to disposing the carbonaceous sorbent of the contact batch into contact with the products of fuel conversion.

With regard to a desirable feature of the apparatus of the present invention, the median particle size distribution ($d_{50}$) of the contact batch, representing 50% of the particles by mass in the entire distribution in the contact batch, is no more than one-half (½) of the median particle size distribution ($d_{50}$) of the starter batch representing 50% of the particles by mass in the entire distribution in the starter batch.

In regard to the use of the apparatus of the present invention, the products of fuel conversion can include fly ash generated by the combustion of coal and the means for separating carbonaceous sorbent which has absorbed mercury from the products of fuel conversion preferably includes a classifier capable of separating carbonaceous sorbent from relatively coarser and denser fly ash. With further regard to the use of the apparatus of the present invention, the products of fuel conversion can include flue gases generated by the combustion of coal and the carbonaceous sorbent adsorbs at least one of elemental mercury and mercury compounds from the flue gases.

Preferably, the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than five (5) minutes following the conversion of the carbonaceous sorbent of the starter batch into the carbonaceous sorbent of the contact batch and the carbonaceous sorbent of the retained batch. Even more preferably, the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than one (1) minute following the conversion of the carbonaceous sorbent of the starter batch into the carbonaceous sorbent of the contact batch and the carbonaceous sorbent of the retained batch.

In accordance with another aspect of the present invention, there is provided a method for removing mercury from the products of fuel conversion including the steps of separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}<15$ microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch, and disposing the contact batch of carbonaceous sorbent into contact with the products of fuel conversion at a contact location such that the carbonaceous sorbent of the contact batch adsorbs mercury. The method of the present invention further includes transporting carbonaceous sorbent of the contact batch to the contact location in a manner in which, on average, at least ninety percent (90%) of the carbonaceous sorbent of the contact batch is delivered to the contact location in less than thirty (30) minutes following the conversion of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch. Additionally, the method of the present invention includes separating carbonaceous sorbent which has absorbed mercury from the products of fuel conversion.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
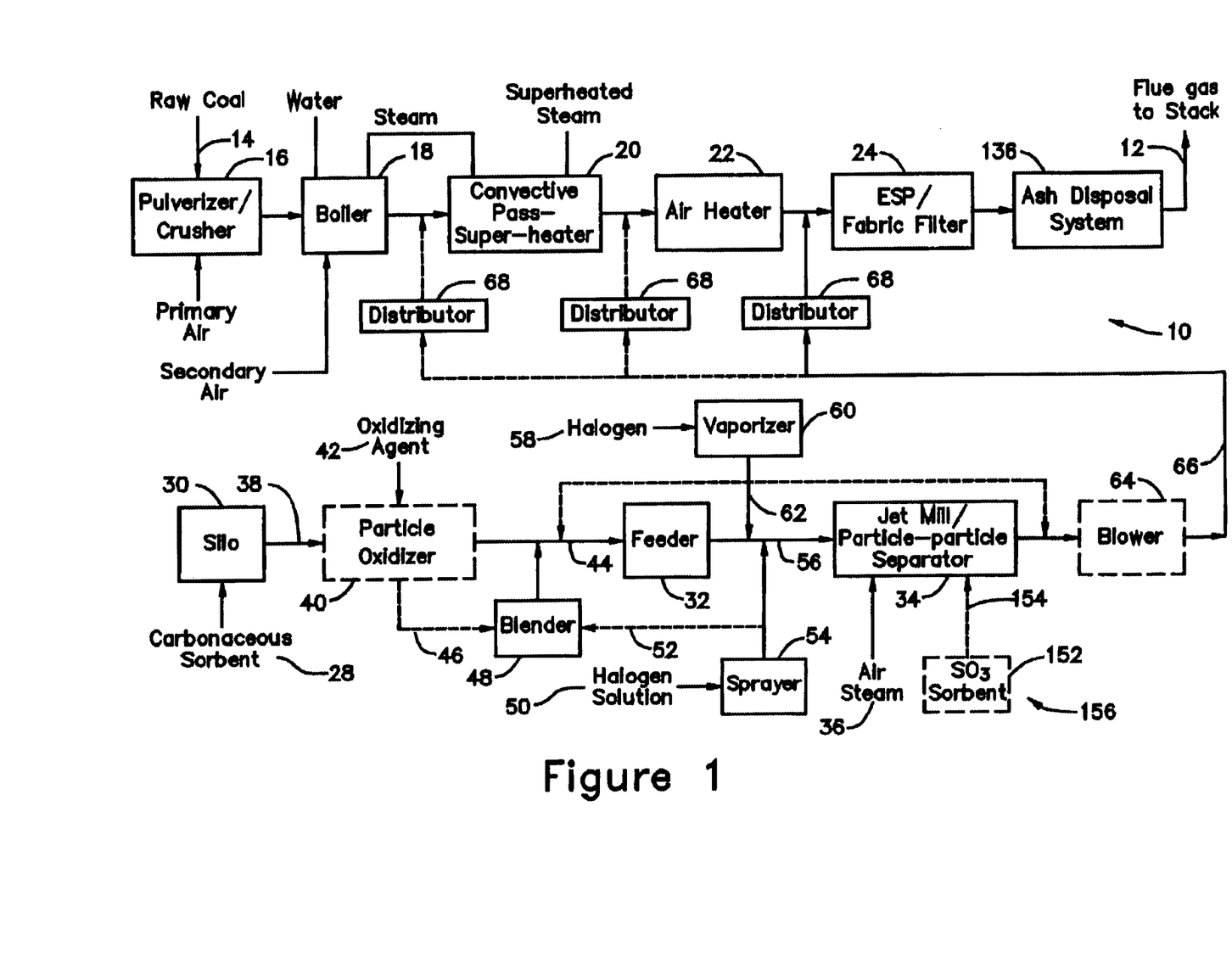
FIG. 1 is a schematic diagram of a first embodiment of a system in accordance with the present invention for removing elemental mercury or mercury compounds from the flue gases from coal combustion.

With reference to FIG. 1, there is illustrated therein an exemplary fuel conversion arrangement for converting a fuel—namely, a solid fossil fuel in the form of coal—into a desired energy form. The exemplary fuel conversion arrangement illustrated in FIG. 1 effects the fuel conversion via combustion of coal and is illustratively configured as a typical 100 MWe coal firing plant 10 which combusts approximately 40 tons/hr of coal with a flue gas flow 12 of about 350,000 $Nm^3$/hr. The raw coal is fed 14 to a pulverizer/crusher 16 where the raw coal is reduced to particulate size. Primary air carries the coal particulates from the pulverizer/crusher 16 to the boiler 18, where the coal is burned to convert water into steam. The temperature of the flue gases leaving the boiler/furnace 18 ranges from 1400 to 2200° F. The flue gases are cooled in the superheater and convective pass 20 (economizer/re-heater) to around 600 to 800° F. before entering the air preheater 22. Flue gas temperatures exiting the air preheater 22 and entering the electrostatic precipitator (ESP)/fabric filter 24 range from 220 to 370° F. If the sorbent requirement for mercury capture were 1 lb./MMacf, about 20 lb/hr of sorbent would need to be injected. At 5 lb/MMacf (120 mg/$Nm^3$), the sorbent requirement would be 100 lb/hr.

In a first embodiment of a system 26 for removing elemental mercury or mercury compounds, a starter batch of carbonaceous sorbent is in the form of carbonaceous sorbent 28 stored in a silo 30, with the carbonaceous sorbent 28 being in an agglomerated state because the very small particles thereof tend to stick to each other. Accordingly, the starter batch of the sorbent 28 is fed by a feeder 32 to a separation device 34, which comminutes (if necessary) and de-agglomerates the sorbent particles 28 into a contact batch of carbonaceous sorbent and a retained batch of carbonaceous sorbent. The contact batch of carbonaceous sorbent has a particle size distribution of carbonaceous sorbent of $d_{50}$<15 microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch.

This device 34 may be a particle-particle separator or a jet mill, where compressed air or high-pressure steam is the energy source. The separation device 34 performs three functions: particle-particle separation; particle size reduction; and classification of fine particles to "product" and either return of the coarse particles to the silo 30 or retention of the coarse particles within the separation device 34 for further processing.

The target particle size distribution is $d_{50}$<15 microns, preferably $d_{50}$<8 microns and most preferably $d_{50}$<4 micron, where $d_{50}$ represents 50% of the particles by mass in the entire distribution. Primary particle size reduction is required when the starting particle size distribution is larger than desired product size. No primary size reduction is required if the primary particle sizes are already smaller than the target product size, such as in the case of carbon black where the primary particle size less than 1 micron. The minimum energy input for this separation and optional size reduction device 34 is 10 kWh/ton, more preferably it is 100 kWh/ton, and most preferably it is 1000 kWh/ton. This energy input can be supplied via high pressure fluid such as steam or compressed air 36 in an air jet mill, or by media such as grinding balls or rollers in a ball mill or roller mill. In addition to handling thereof by the separation device 34, the sorbent particles 28 are subjected to one or more processes before they are injected into the stream of flue gas. In one alternative, the sorbent particles 28 are sent along a path 38 from the silo 30 to an oxidizer unit 40, where the particles are contacted by an oxidizing agent 42 (e.g., ozone, hydrogen peroxide, hot air, concentrated nitric acid), making the outer surfaces of the particles hydrophilic. The treated sorbent may then be fed along a path 44 to the separation device 34 or sent along a path 46 to a blender 48 where a solution 50 is sprayed 52 on the sorbent particles by a sprayer 54 to deposit a halogen on the surface of the sorbent particles 28. The solution 50 is chosen from potassium iodide, iodine dissolved in potassium iodide, alkali halides (e.g., NaCl), and halide salts (e.g., $CaCl_2$), or halogen acids (e.g., HCl, HI, HBr, HF) dissolved in water. A typical additive amount results in a halogen concentration in the sorbent of about 0 to 5 percent. The treated sorbent is then fed along a path 56 to the separation device 34.

A halogen 58, such as chlorine, bromine, iodine or fluorine, may also be deposited on the sorbent 28 by vaporizing the halogen 58 in a vaporizer 60 and condensing/adsorbing it on the sorbent 28. The vaporized halogen may be injected along a path 62 into the sorbent 28 between the particle oxidizer 40 (described above) and the feeder 32, between the feeder 32 and the separation device 34, or onto the "fines" and de-agglomerated particles leaving the separation device 34.

Figure 6:
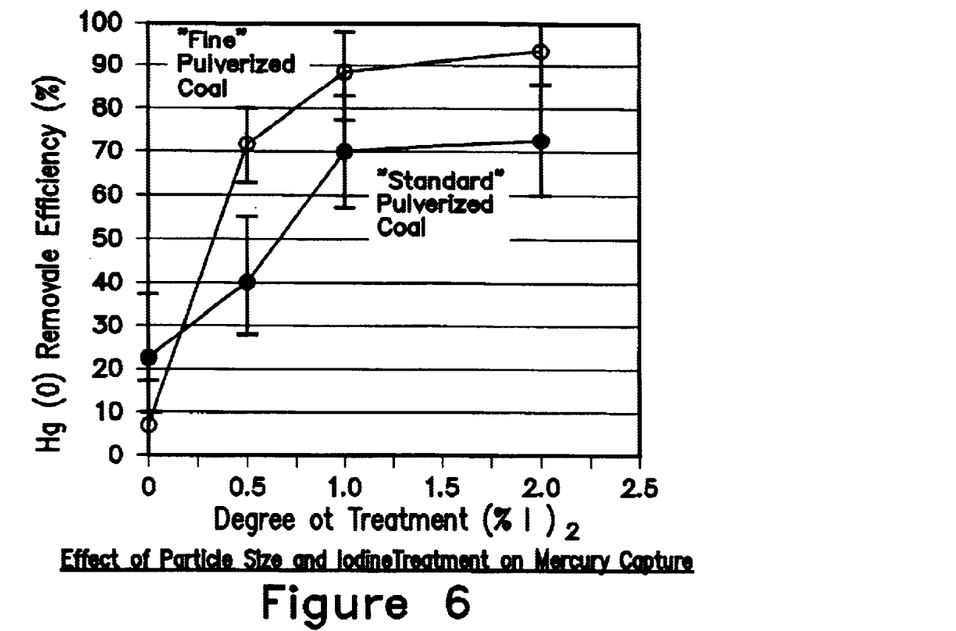
FIG. 6 is a graph illustrating the effect of sorbent particle size and halogen treatment on mercury capture.

The effect of halogen treatment on mercury removal is shown in FIG. 6 and Table 1. FIG. 6 shows that treating coal sorbent 28 with iodine (0 to 2.5 weight percent) significantly improves sorbent performance. About 10 percent mercury removal was obtained with no iodine treatment for "fine" coal sorbent, while about 95 percent mercury removal was obtained with 2.0 percent iodine addition to "fine" coal sorbent. Table 1 shows the effect of halogen treatment for carbon black sorbent and activated carbon sorbent. For carbon black with a surface area of 100 $m^2$/g and at a sorbent concentration of 50 mg/$Nm^3$ in the flue gas, addition of iodine to sorbent 28 (1 percent $I_2$ in carbon after treatment) improved the mercury removal performance from 20 percent to 100 percent. For activated carbon at a sorbent concentration of 100 mg/$Nm^3$ in the flue gas, addition of iodine to sorbent (1 percent $I_2$ in carbon after treatment) improved the mercury removal performance from 75 percent to 90 percent.

TABLE 1

Mercury Removal Efficiencies from an Air Stream with Various Sorbents and Sorbent Concentrations (~200° F.)

| Sorbent | Sorbent Concentration (mg/$Nm^3$) 0 | 20 | 35 | 50 | 100 |
|---|---|---|---|---|---|
| Carbon Black (SA = 100 $m^2$/g, $d_{50}$ < 1 μm) | 0 | <5 | — | 20 | 30 |
| Carbon Black (SA = 500 $m^2$/g, $d_{50}$ < 1 μm) | 0 | <5 | — | 20 | — |
| Carbon Black (SA = 500 $m^2$/g with 1% $I_2$ | 0 | 40 | 60 | 100 | 100 |
| Carbon Black (SA = 100 $m^2$/g with 1% $I_2$ | 0 | 20 | — | 100 | 100 |
| Activated Carbon ($d_{50}$ = 18 μm) with 1% $I_2$ | 0 | 15 | — | 60 | 90 |
| Activated Carbon ($d_{50}$ = 18 μm) | 0 | — | — | — | 75 |

*SA = Surface area; $d_{50}$ = Weight mean particle size

Figure 7:
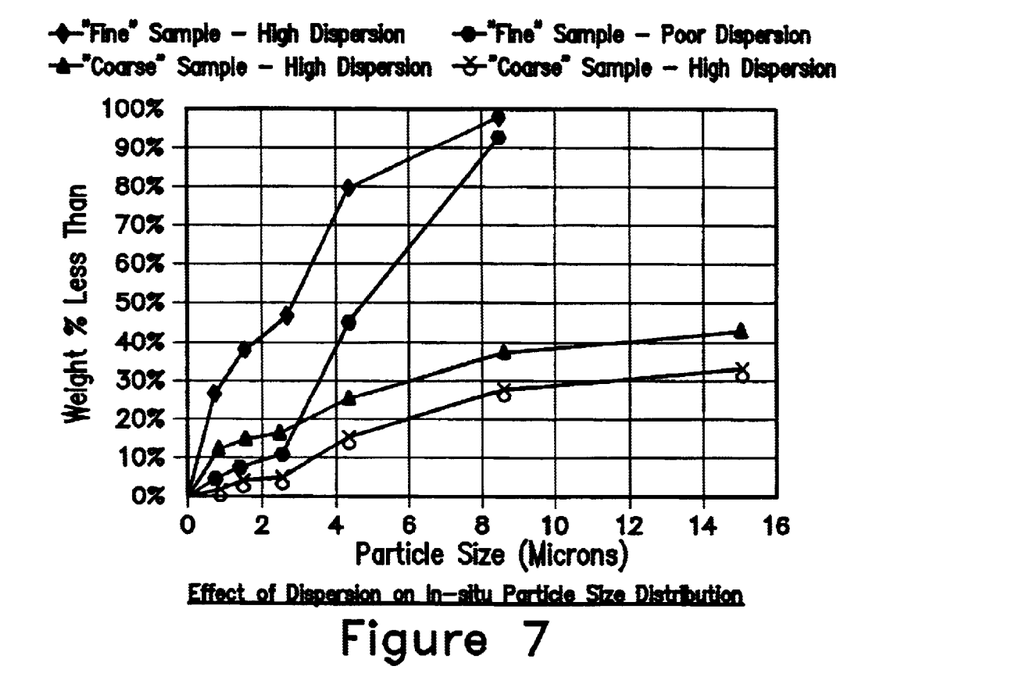
FIG. 7 is a graph illustrating the effect of dispersion on in-situ particle size distribution.

FIG. 7 shows in-situ size distributions for two samples injected into a duct with different levels of energy used for particle-particle separation (de-agglomeration). The first sample is a "coarse" commercial powdered activated carbon, with a mean particle size ($d_{50}$) of 18 μm. The second sample is a "fine" sorbent with a mean particle size ($d_{50}$) of 3 μm. When either sample was injected into the duct with a low energy level being used for particle separation ("poor" dispersion), the actual size of particles observed in the duct was significantly coarser than when higher energy was used for particle separation ("high" dispersion).

The static pressure of air leaving the separation device 34 is around 5 to 10 inches water gauge. This static head may be insufficient to transport and distribute the sorbent 28 via the injection lances into the flue gas duct. As seen in FIG. 1, a "dirty air" material-handling fan/blower 64 may be placed after the separation device 34 to increase the static head for sorbent transport and distribution. A static head of about 30 inches water gauge is preferred.

The inventive apparatus also comprises a means for disposing the contact batch of carbonaceous sorbent into contact with the products of fuel conversion at a contact location such that the carbonaceous sorbent of the contact batch adsorbs mercury. Accordingly, the de-agglomerated sorbent 28 and the conveying air/steam is injected at a contact location 66 into the flue gas duct through such a means in the form of a distributor 68 having multiple lances. The injector tip is designed to impart a tangential momentum to the sorbent stream (swirl tip) and increase the rate of spread and distribution of the sorbent 28 in the flue gas stream 12. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Thus, the system 26 for removing elemental mercury or mercury compounds handles carbonaceous sorbent 28 of a starter batch stored in a silo 30 in an agglomerated state. The sorbent 28 is fed by a feeder 32 to a separation device 34, which comminutes (if necessary) and de-agglomerates the sorbent particles 28 to their primary size distribution. The de-agglomerated sorbent 28 of a contact batch created from the starter batch is then conveyed by the airsteam for injection at a contact location 66 in a flue gas duct whereat carbonaceous sorbent of the contact batch adsorbs mercury from the flue gas. Preferably, the transport means of the inventive apparatus which transports carbonaceous sorbent of the contact batch to the contact location operates to deliver, on average, at least ninety percent (90%) of the carbonaceous sorbent of the contact batch to the contact location 66 in less than thirty (30) minutes following the separation of the carbonaceous sorbent of the starter batch into the carbonaceous sorbent of the contact batch and the carbonaceous sorbent of the retained batch, more preferably operates to deliver, on average, at least ninety percent (90%) of the carbonaceous sorbent of the contact batch to the contact location 66 in less than five (5) minutes following the separation, and, most preferably, operates to deliver, on average, at least ninety percent (90%) of the carbonaceous sorbent of the contact batch to the contact location 66 in less than one (1) minute following the separation.

Figure 2:
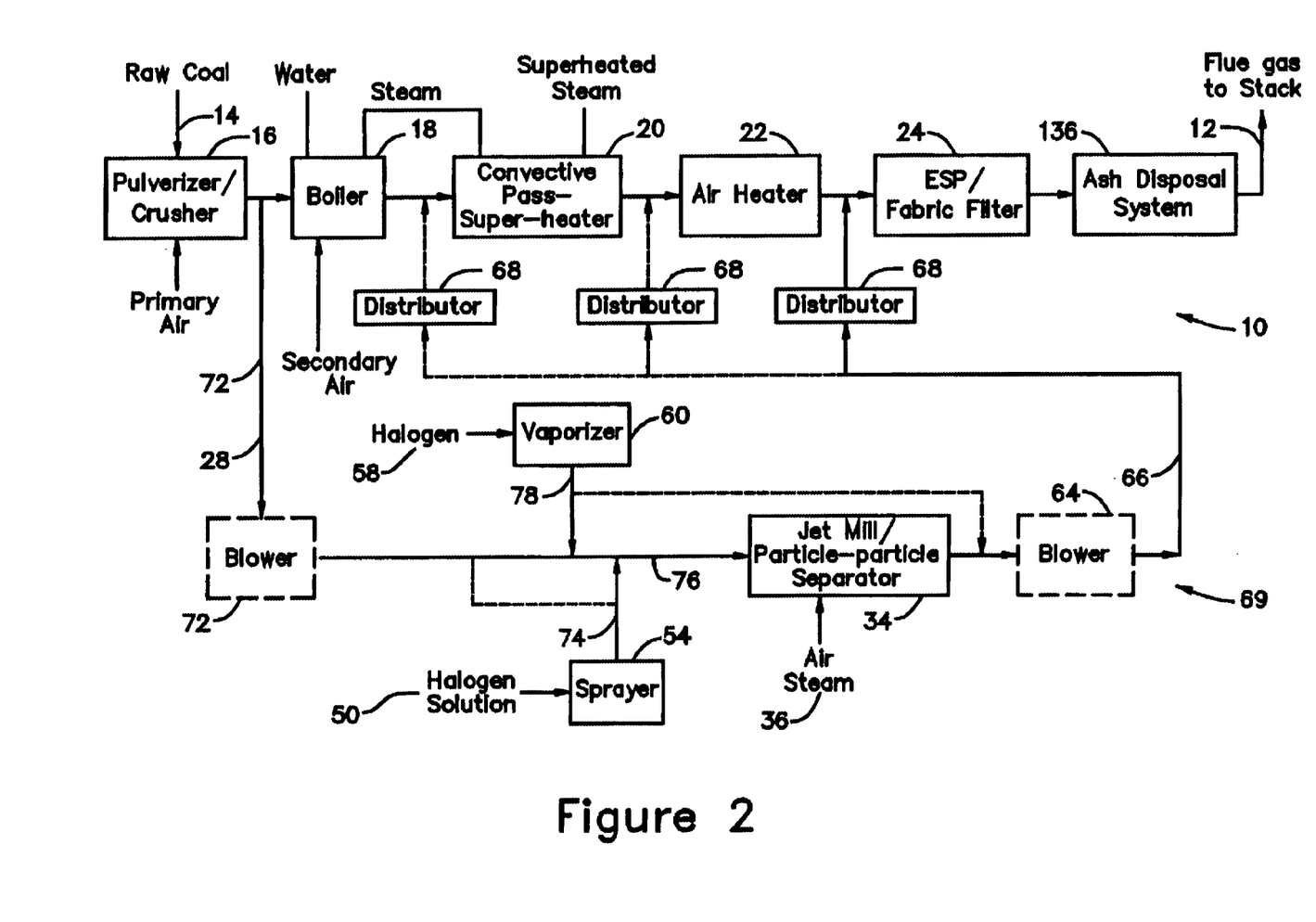
FIG. 2 is a schematic diagram of a second embodiment in accordance with the present invention of a system for removing elemental mercury or mercury compounds from the flue gases from coal combustion.

In a second embodiment of a system for removing elemental mercury or mercury compounds in accordance with the present invention and shown in FIG. 2, hereinafter designated as a system 69 for removing elemental mercury or mercury compounds, a portion of the coal pulverized in the pulverizer 16 is extracted at a location 70 from the pulverizer exit as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 70. A blower 72 may be required to provide the necessary motive force for moving the extracted sorbent solids 28.

The extracted sorbent solids 28 are subjected to one or more processes. The sorbent solids 28 may be sprayed at a location 74 with a solution 50 to deposit a halogen on the surface of the sorbent particles 28. The solution 50 is chosen from potassium iodide, iodine dissolved in potassium iodide, alkali halides (e.g. NaCl), and halide salts (e.g. $CaCl_2$), or halogen acids (e.g. HCl, HI, HBr, HF) dissolved in water. A typical additive amount results in a halogen concentration in the sorbent 28 of about 0 to 5 percent. The treated sorbent 28 is then fed along a path 76 to the separation device 34.

A halogen 58, such as chlorine, bromine, iodine or fluorine, may also be deposited on the sorbent by vaporizing the halogen in a vaporizer 60 and condensing/adsorbing it on the sorbent. The vaporized halogen may be injected at a location 78 into the sorbent 28 between the blower 72 and the separation device 34, or onto the "fines" and de-agglomerated particles leaving the separation device 34.

A "dirty air" material-handling fan/blower 64 may be placed after the separation device 34 to increase the static head for sorbent transport and distribution. The de-agglomerated sorbent 28 and the conveying air/steam is injected into the flue gas duct through a distributor 68 similar to that of the first embodiment 26. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Figure 3:
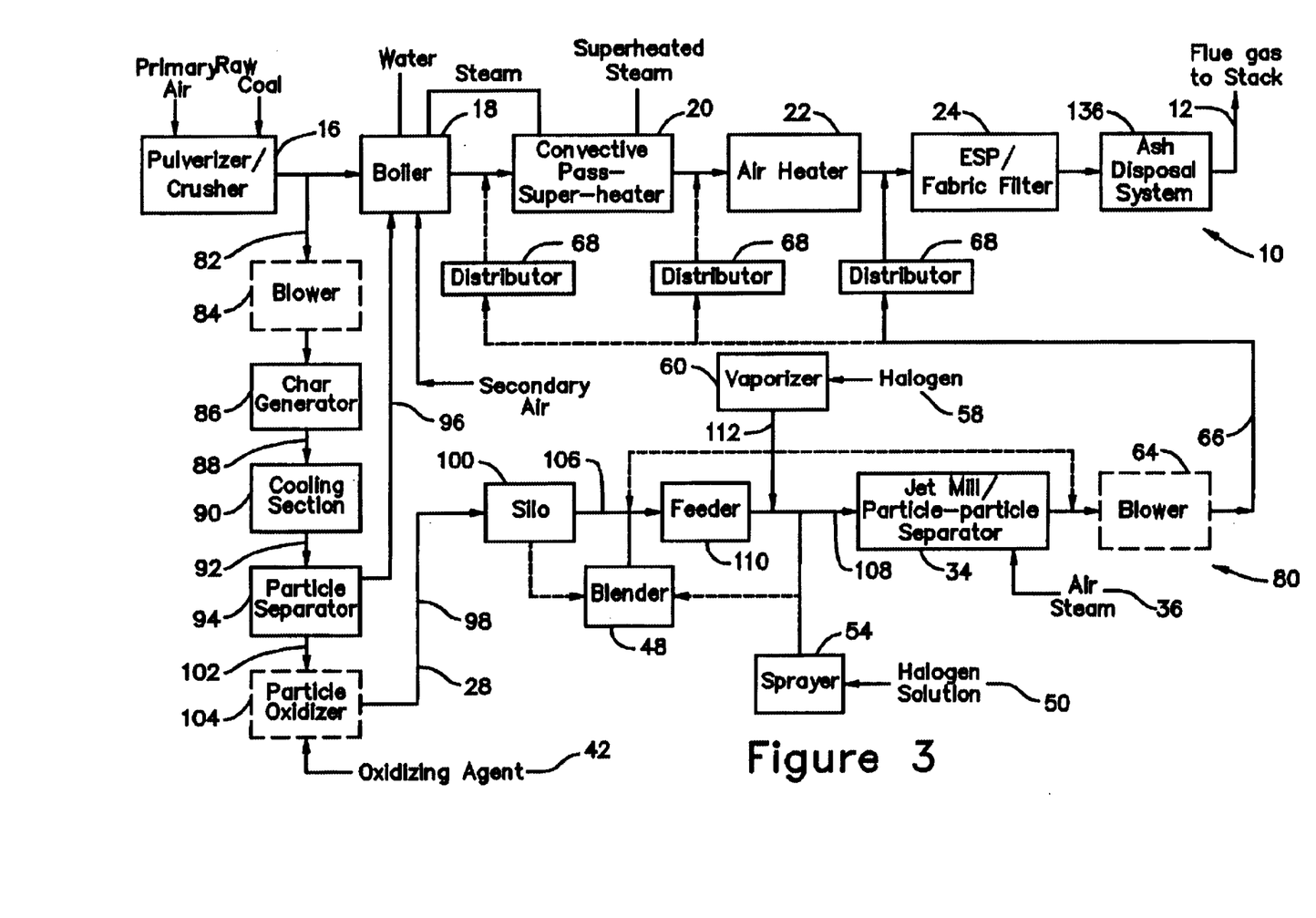
FIG. 3 is a schematic diagram of a third embodiment of a system in accordance with the present invention for removing elemental mercury or mercury compounds from the flue gases from coal combustion.

In a third embodiment of a system for removing elemental mercury or mercury compounds in accordance with the present invention and shown in FIG. 3, hereinafter designated as a system 80 for removing elemental mercury or mercury compounds, a portion of the coal pulverized in the pulverizer 16 is also extracted at a location 82 from the pulverizer exit as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 82. A blower 84 may be required to provide the necessary motive force for moving the extracted sorbent solids 28.

The extracted coal is partially combusted in a char generator reactor 86 by subjecting the coal to temperatures between 300 and 1500° C. The air supply to the char generator 86 is limited to achieve only partial combustion of the coal, preferably only the volatile portion of the coal. Accordingly, air amounts are preferably controlled between 0.3 and 1.0 times the amount required for complete combustion of coal, and more preferably between 0.5 and 0.7 times the amount required for complete combustion of coal.

The high temperatures of the solids and gases exiting along a path 88 the char generator 86 are reduced in a downstream cooling section 90. Water quenching or an air-, water- or steam-cooled heat exchanger may be used to cool the gases and the solids. The temperature of the gases and solids exiting the cooling section 90 is preferably around 300° C. or lower.

The cooled gases and solids (char) are then sent along a path 92 to a particle separator 94, preferably a cyclone. The separated gases, with some fine particles, are discharged at a location 96 to the main boiler 18 to ensure complete combustion of the unburnt hydrocarbons and other combustible species like carbon monoxide and carbon. The particles 28 separated by the particle separator 94 are discharged along a path 98 to a silo 100. Alternatively, the sorbent particles 28 may be discharged along a path 102 to an oxidizer unit 104, where the particles 28 are contacted by an oxidizing agent 42 (e.g. ozone, hydrogen peroxide, hot air, concentrated nitric acid), making the outer surfaces of the particles hydrophilic. The treated sorbent is then discharged along a path 98 to the silo 100.

As the sorbent 28 is fed along a path 106 from the silo 100 to the flue gas stream 12, a halogen is deposited on the outer surface of the sorbent particles 28. In one alternative, the sorbent particles 28 are sent to a blender 48 where a solution 50 is sprayed on the sorbent particles 28 to deposit the halogen on the surface of the sorbent particles 28. The solution 50 is chosen from potassium iodide, iodine dissolved in potassium iodide, alkali halides (e.g., NaCl), and halide salts (e.g., $CaCl_2$), or halogen acids (e.g., HCl, HI, HBr, HF) dissolved in water. A typical additive amount results in a halogen concentration in the sorbent of about 0 to 5 percent. The treated sorbent 28 is then fed along a path 108 to the separation device 34 by a feeder 110.

Alternatively, the halogen (e.g., chlorine, bromine, iodine or fluorine) may be deposited on the sorbent by vaporizing the halogen 58 in a vaporizer 60 and condensing/adsorbing it on the sorbent 28. The vaporized halogen may be injected at a location 112 into the sorbent 28 between the silo 100 and the feeder 110, between the feeder 110 and the separation device 34 or onto the "fines" and de-agglomerated particles leaving the separation device 34.

A "dirty air" material-handling fan/blower 64 may be placed after the separation device 34 to increase the static head for sorbent transport and distribution. The de-agglomerated sorbent 28 and the conveying air/steam is injected into the flue gas duct through a distributor 68 similar to that of the first embodiment 26. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Figure 8:
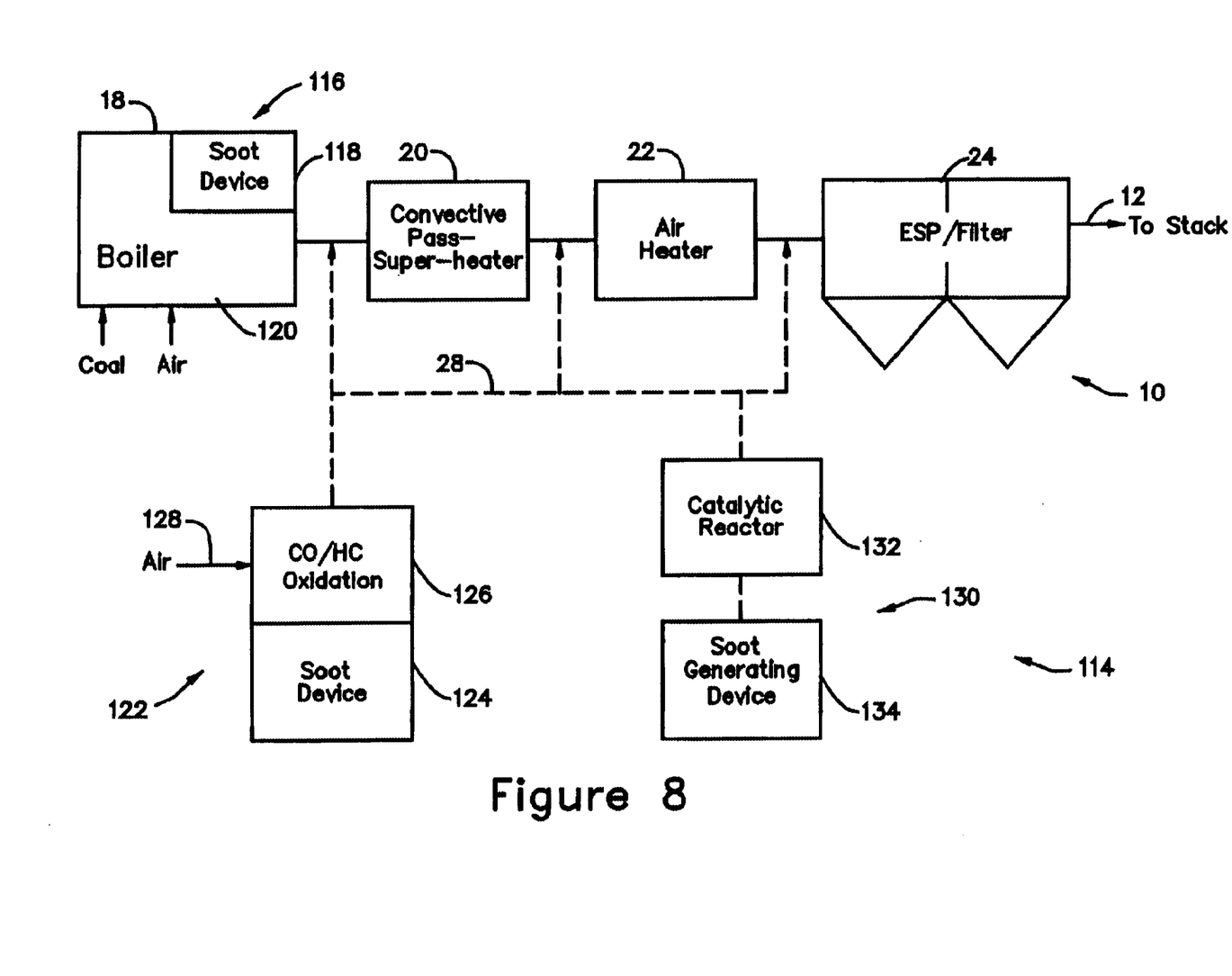
FIG. 8 is a schematic diagram of a fourth embodiment of a system in accordance with the present invention for removing elemental mercury or mercury compounds from the flue gases from coal combustion.

In a fourth embodiment of a system for removing elemental mercury or mercury compounds in accordance with the present invention and shown in FIG. 8, hereinafter designated as a system 114 for removing elemental mercury or mercury compounds, the sorbent 28 has the most preferable particle size mercury removal system—namely, $d_{50}<2$ micron, where $d_{50}$ represents 50% of the particles by mass in the entire distribution—and this is achieved in this fourth embodiment by configuring the sorbent 28 as carbon black or soot. Compared to "coarse" and "agglomerated" activated carbon, much smaller quantities of carbon black/soot are required to capture a prescribed amount of mercury in boiler flue gases. For example, to remove 90% of elemental mercury, 50 $mg/Nm^3$ of impregnated carbon black are required compared to greater than 1000 $mg/Nm^3$ of "coarse" and "agglomerated" activated carbon. Also, much smaller quantities of oxidizing agents such as iodine would be required for impregnation of the sorbent 28 (less than 1% by weight of carbon) compared to activated carbon, where 1–10% by weight of carbon would be required.

Figure 9:
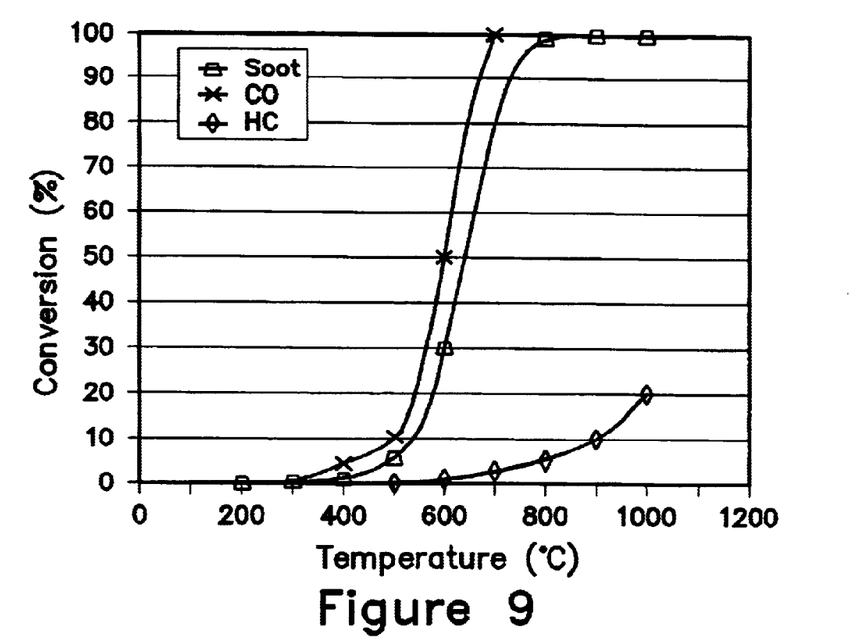
FIG. 9 is a graph illustrating conversion (%) of soot, CO, and HC as a function of temperature (° C.)

In a sub-assembly 116 of this system 114 for generating the sorbent 28 with a desirably very fine particle size distribution, a soot-generating device 118 is disposed within the high temperature region of the boiler 18. An oxidizing region 120 of the boiler 18, downstream of the soot device 118, ensures that the CO and HC generated during the soot generating process are destroyed. With reference to FIG. 9, the temperature range in the oxidizing region is preferably 500 to 1000° C., and more preferably 600 to 800° C., to ensure minimal soot destruction and maximal CO/HC destruction.

In an alternative sub-assembly 122 of this system 114 for generating the sorbent 28 with a desirably very fine particle size distribution, the carbon black/soot is generated in a separate soot generating device 124 having a CO/HC oxidation chamber 126. The CO/HC oxidation chamber 126 may have an input 128 for receiving oxygen or air required to destroy the CO/HC. The residence time of the stream of carbon black/soot within the CO/HC oxidation chamber 126 and the temperature maintained in the CO/HC oxidation chamber 126 (preferably 500 to 1000° C., and more preferably 600 to 800° C.) are optimized to destroy the CO/HC with minimal soot destruction.

Figure 10:
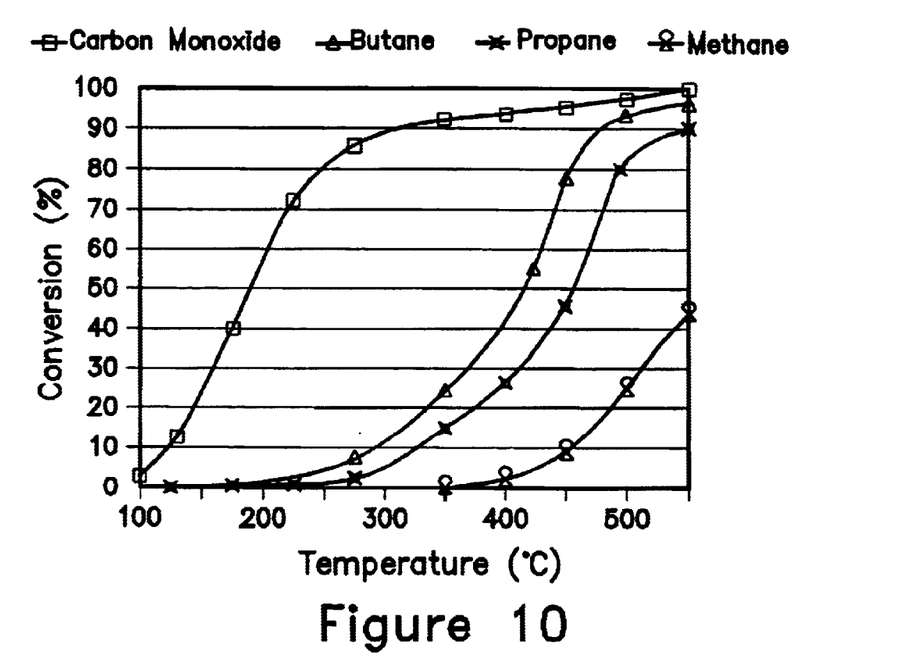
FIG. 10 is a graph illustrating a typical destruction profile for CO and HC with a PGM catalyst.

In still another alternative sub-assembly 130 of this system 114 for generating the sorbent 28 with a desirably very fine particle size distribution, a catalytic reactor 132 for targeted CO and HC destruction is disposed between the soot generating device 134 and the flue gas stream 12. One example of such a catalytic reactor 132 is a monolith (e.g. made of stainless steel or ceramic) coated with a variety of platinum group metals (e.g., platinum, rhodium, palladium). A typical destruction profile for CO and HC with a PGM catalyst is shown in FIG. 10. At the temperatures shown in FIG. 10, soot would not be destroyed to any significant extent.

In conventional coal-fired plants, unburnt carbon arriving at the electrostatic precipitator (ESP) or fabric filter is predominantly in the form of the large coal particles that have not finished combustion. Fine particles of coal are rarely present in the normal application since they are completely burnt out. In conventional plants, therefore, the ash collected in the precipitator or fabric filter consists of predominantly larger carbon particles and smaller fly ash particles, which are very difficult to separate.

In the mercury removal systems 26, 69, 80, 114 described above, the carbonaceous mercury sorbent 28 is generally manufactured external to the boiler/main combustor 18 and then subsequently reduced in size and then introduced into the flue gas stream 12. The sorbent particles 28 are engineered to be extremely small and are therefore distinct from the ash and may be separated from the normal ash in the ash disposal system 136 shown in FIGS. 1–3.

Figure 4:
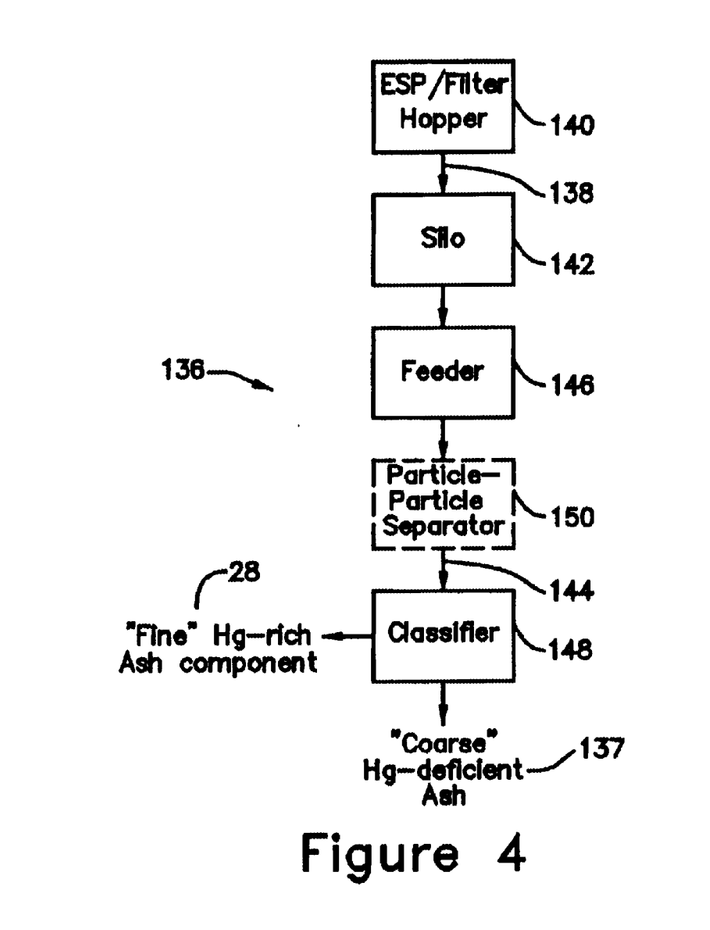
FIG. 4 is a schematic diagram of the ash disposal system of FIGS. 1–3.

With reference to FIG. 4, the mercury-laden sorbent 28 is collected in the ESP/fabric filter 24, along with fly ash 137. The mercury-laden sorbent-fly ash mixture is transferred along a path 138 from the hopper 140 of the ESP/fabric filter 24 to an ash storage silo 142 and then fed along a path 144 with a feeder 146 to a classifier 148, which is capable of separating the "fine" and low-density mercury sorbent 28 from the coarser and denser fly ash 137. The classifier 148 is preferably of the dynamic type with a separately controlled classifier wheel, operating at tip speeds of preferably greater than 50 m/s and more preferably 100 m/s to ensure good separation and product recovery.

A particle-particle separator 150 may be disposed between the silo 142 and the classifier 148. The function of the particle-particle separator 150 is to separate the mercury-laden sorbent 28 from the fly ash 137, which would have agglomerated as a result of being collected together in the ESP/fabric filter 24 and stored in the hopper 140 and silo 142. A jet mill can be used for this purpose, although, little size reduction is required and therefore the energy consumption would be lower than if the particle size has to be reduced.

Figure 5:
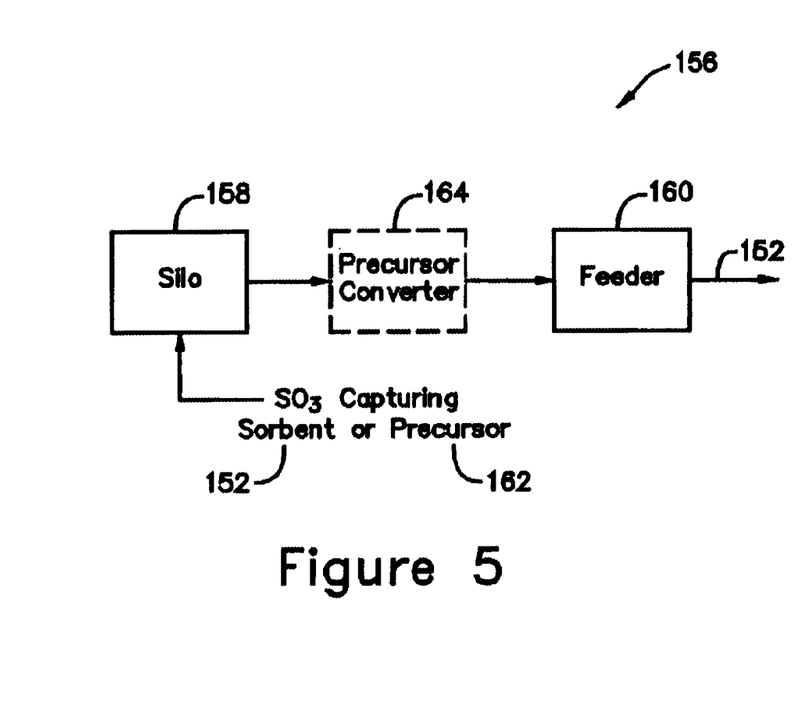
FIG. 5 is a schematic diagram of an optional $SO_3$ (sulfur trioxide) sorbent addition subsystem.

As shown in FIG. 1, a $SO_3$ (sulfur trioxide)-capturing sorbent 152 may be injected at a location 154 into the flue gas stream 12 along with or separate from the mercury sorbent 28. With additional reference to FIG. 5, a system 156 for injecting the $SO_3$ (sulfur trioxide)-capturing sorbent 152 includes a silo 158. The $SO_3$ (sulfur trioxide)-capturing sorbent 152 stored in the silo 158 is metered to the separation device 34 by a feeder 160. The de-agglomerated particles 152 are then injected into the flue gas duct by the blower 64 and distributor 68. A separation device, blower and distributor which are separate from the ones used by the mercury sorbent 28 may also be utilized (not shown). Alternatively a $SO_3$ (sulfur trioxide)-capturing sorbent precursor 162 may be stored in the silo 158 and fed to a precursor converter 164. For example, limestone 162 may be stored in the silo 158 and converted to lime 152 in a calciner 164. It should be appreciated that the $SO_3$ (sulfur trioxide)-capturing sorbent system 156 may be used with or separate from any of the mercury removal systems 26, 69, 80, 114.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for removing mercury from the products of fuel conversion comprising:
    means for separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}<15$ microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch;
    means for disposing the contact batch of carbonaceous sorbent into contact with the products of fuel conversion at a contact location such that the carbonaceous sorbent of the contact batch adsorbs mercury; and
    transport means for transporting carbonaceous sorbent of the contact batch to the contact location in a manner in which, on average, at least ninety percent (90%) of the carbonaceous sorbent of the contact batch is delivered to the contact location in less than thirty (30) minutes following the separation of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch.

2. An apparatus according to claim 1, wherein the means for separating a starter batch of carbonaceous sorbent includes particle size reducing means for reducing the particle size of carbonaceous sorbent from a relatively larger coarse particle size to a relatively smaller fine particle size.

3. An apparatus according to claim 1, wherein the means for separating a starter batch of carbonaceous sorbent is operable to create a contact batch of carbonaceous sorbent having a particle size distribution of carbonaceous sorbent of $d_{50}<8$ microns, where $d_{50}$ represents 50% of the particles by mass in the entire distribution in the contact batch.

4. An apparatus according to claim 1, wherein the means for separating a starter batch of carbonaceous sorbent is operable to create a contact batch of carbonaceous sorbent having a particle size distribution of carbonaceous sorbent of $d_{50}<4$ microns, where $d_{50}$ represents 50% of the particles by mass in the entire distribution in the contact batch.

5. An apparatus according to claim 1, and further comprising means for depositing at least one of a halogen species and an acidic species on the carbonaceous sorbent of the contact batch prior to disposing the carbonaceous sorbent of the contact batch into contact with the products of fuel conversion.

6. An apparatus according to claim 1, wherein the products of fuel conversion include fly ash generated by the combustion of coal and a means for separating carbonaceous sorbent which has absorbed mercury from the products of fuel conversion includes a classifier capable of separating carbonaceous sorbent from relatively coarser and denser fly ash.

7. An apparatus according to claim 1, wherein the products of fuel conversion include flue gases generated by the combustion of coal and the carbonaceous sorbent adsorbs at least one of elemental mercury and mercury compounds from the flue gases.

8. An apparatus according to claim 1, wherein the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than five (5) minutes following the separation of the carbonaceous sorbent of the starter batch into the carbonaceous sorbent of the contact batch and the carbonaceous sorbent of the retained batch.

9. An apparatus according to claim 1, wherein the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than one (1) minute following the separation of the carbonaceous sorbent of the starter batch into the carbonaceous sorbent of the contact batch and the carbonaceous sorbent of the retained batch.

10. A method for removing mercury from the products of fuel conversion comprising:
    separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}<15$ microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch;
    disposing the contact batch of carbonaceous sorbent into contact with the products of fuel conversion at a contact location such that the carbonaceous sorbent of the contact batch adsorbs mercury; and
    transporting carbonaceous sorbent of the contact batch to the contact location in a manner in which, on average, at least ninety percent (90%) of the carbonaceous sorbent of the contact batch is delivered to the contact location in less than thirty (30) minutes following the separation of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch.

11. A method according to claim 10, wherein separating a starter batch of carbonaceous sorbent includes reducing the particle size of carbonaceous sorbent from a relatively larger coarse particle size to a relatively smaller fine particle size.

12. A method according to claim 10, wherein separating a starter batch of carbonaceous sorbent includes creating a contact batch of carbonaceous sorbent having a primary particle size distribution of carbonaceous sorbent of $d_{50}<8$ microns, where $d_{50}$ represents 50% of the particles by mass in the entire distribution in the contact batch.

13. A method according to claim 10, wherein separating a starter batch of carbonaceous sorbent includes creating a contact batch of carbonaceous sorbent having a primary particle size distribution of carbonaceous sorbent of $d_{50}<4$ microns, where $d_{50}$ represents 50% of the particles by mass in the entire distribution in the contact batch.

14. A method according to claim 10, and further comprising depositing at least one of a halogen species and an acidic species on the carbonaceous sorbent of the contact batch prior to disposing the carbonaceous sorbent of the contact batch into contact with the products of fuel conversion.

15. A method according to claim 10, wherein the products of fuel conversion include fly ash generated by the combustion of coal and separating carbonaceous sorbent which has absorbed mercury from the products of fuel conversion includes subjecting the products of fuel conversion to a classification process operable to separate carbonaceous sorbent from relatively coarser and denser fly ash.

16. A method according to claim 10, wherein the products of fuel conversion include flue gases generated by the combustion of coal and the carbonaceous sorbent adsorbs at least one of elemental mercury and mercury compounds from the flue gases.

17. A method according to claim 10, wherein transporting carbonaceous sorbent of the contact batch to the contact location includes transporting the carbonaceous sorbent of the contact batch in a manner in which, on average, at least ninety percent (90%) of the carbonaceous sorbent of the contact batch is delivered to the contact location in less than five (5) minutes following the separation of the carbonaceous sorbent of the starter batch into the carbonaceous sorbent of the contact batch and the carbonaceous sorbent of the retained batch.

18. A method according to claim 10, wherein transporting carbonaceous sorbent of the contact batch to the contact location includes transporting the carbonaceous sorbent of the contact batch in a manner in which, on average, at least ninety percent (90%) of the carbonaceous sorbent of the contact batch is delivered to the contact location in less than one (1) minute following the separation of the carbonaceous sorbent of the starter batch into the carbonaceous sorbent of the contact batch and the carbonaceous sorbent of the retained batch.

19. An apparatus according to claim 1, and further comprising means for separating carbonaceous sorbent which has absorbed mercury from the products of fuel conversion.

20. An apparatus according to claim 1, wherein the median particle size distribution ($d_{50}$) of the contact batch, representing 50% of the particles by mass in the entire distribution in the contact batch, is no more than one-half (½) of the median particle size distribution ($d_{50}$) of the starter batch representing 50% of the particles by mass in the entire distribution in the starter batch.

* * * * *